(12) United States Patent
Mora

(10) Patent No.: US 6,654,861 B2
(45) Date of Patent: Nov. 25, 2003

(54) METHOD TO MANAGE MULTIPLE COMMUNICATION QUEUES IN AN 8-BIT MICROCONTROLLER

(75) Inventor: Oscar Mora, Caracas (VE)

(73) Assignee: Smart Matic Corp., Boca Raton ( * ) Notice: Subject to any disclaimer, the term of this patent is extended or adjusted under 35 U.S.C. 154(b) by 70 days.

(21) Appl. No.: 09/682,093

(22) Filed: Jul. 18, 2001

(65) Prior Publication Data

US 2003/0018867 A1 Jan. 23, 2003

(51) Int. Cl.[7] .............................................. G06F 12/00
(52) U.S. Cl. ........................................ 711/156; 711/154
(58) Field of Search .................................. 711/156, 154

(56) References Cited

U.S. PATENT DOCUMENTS

| | | | | |
|---|---|---|---|---|
| 3,876,979 A | * | 4/1975 | Winn et al. | 714/748 |
| 5,218,670 A | * | 6/1993 | Sodek et al. | 358/1.16 |
| 5,265,257 A | * | 11/1993 | Simcoe et al. | 710/263 |
| 5,764,938 A | * | 6/1998 | White et al. | 712/200 |
| 5,826,053 A | * | 10/1998 | Witt | 712/210 |
| 5,892,979 A | * | 4/1999 | Shiraki et al. | 710/52 |
| 6,038,621 A | * | 3/2000 | Gale et al. | 710/56 |
| 6,137,807 A | * | 10/2000 | Rusu et al. | 370/429 |

* cited by examiner

*Primary Examiner*—Reba I. Elmore
(74) *Attorney, Agent, or Firm*—Jeffrey Furr

(57) ABSTRACT

A method and algorithm to handle a memory bank queue using a low processing power 8-bit microcontroller is provided. The microcontroller is used to receive information in the form of a data packet from a communication interface shared with an external system. Each received packet is temporarily stored in a logical FIFO queue while the first packet in the queue packet is processed, modified or decoded according to a process or algorithm made by the user. The result keeps the same queue position until a second system is able to receive it through a second communication interface. In the same manner, any information packet coming from the second system is queued and processed back to retrieve a result to the first processor. This invention provides a mechanism to maintain two or more logic queues sharing the same physical RAM, one for each kind of process related to packets flowing from one interface to another. A banked memory structure is used, considering each bank as a generic memory buffer that can be occupied by any of the existing queues. Adequate information about each queue is stored to keep the queue's logic order. Appropriate low-complexity algorithms have been defined to use such information to manage the available buffers, suitable to the processing power of an 8-bit microcontroller.

11 Claims, 8 Drawing Sheets

METHOD TO MANAGE MULTIPLE COMMUNICATION QUEUES IN AN 8-BIT MICROCONTROLLER

BACKGROUND OF INVENTION

1. Field of Invention

This invention relates to the handling of FIFO communication queues in a low processing power 8-bit microcontroller.

2. Discussion of Prior Art

The programming of a given process or algorithm in a low processing power 8-bit microcontroller (8-BMC), consisting of receiving an input data and executing a process over such data to obtain a result, can contain the elements shown on FIG. 1.

An 8-BMC 110 is progranmied with a bi-directional process 112. Such process uses a banked RAM 114, which consists of a series of memory banks B1, B2, B3 . . . Bn controlled by the process. The RAM (random access memory) 114 comprises the internal 8-bit registers available in the microcontroller, any external RAM, or any combination of both. In any case, each bank is considered a memory buffer. Two interfaces (116a, 116b) connect the 8-BMC 110 to external systems or microprocessors not shown in the figure. The process 112 takes a size-defined packet of bytes coming from the interface 116a and stores it in any of the memory banks available in the RAM 114 to finally apply the process itself and return a result through the interface 116b. In the same manner, any information coming from, the interface 116b goes through a similar mechanism with an inverse process to obtain an output at interace 116a.

Those skilled in the art can assume such interfaces as any kind of communication standards widely used in microcomputers, like an asynchronous serial port or a synchronous SPI (Serial Peripheral Interface) port, an I²C master-slave port, a parallel slave port or any other user-defined method of communication. It is very common to find the above communication standards implemented on the hardware itself on an 8-BMC. A hardware implementation avoids the need of programming the standard, increasing the device's general performance. Rather, the sending and receiving mechanism is made through some specialized memory positions accessible by the program.

Due to the possible use of different interfaces, the time needed to transfer an information packet through the interface 116a won't be the same as a transfer at interface 116b. For example, a serial transfer will last longer than a parallel information transfer. Furthermore, the size of the information could be different from interface 116a to interface 116b, since there is a process 112 involved. Such process could be for example a communication protocol encoder-decoder or a security verification algorithm, so the information coming in from one interface could be larger or smaller than the information coming out to the second interface.

Furthermore, the systems behind each interface could have different processing power and speed, and usually the faster one could handle more information by time unit than the slower one. Additionally, the amount of information sent or received by those systems can vary dynamically according to its own program or process.

Thus the interface speed, the size of the information packets, the involved kind of process and the behavior of the external systems determine the amount of information passing through the 8-BMC. In order to handle the information going from interface 116a to interface 116b or vice versa, two different memory queues are needed to temporally store and process each packet.

A static assignment of memory buffers to each queue is a simple solution. However, any variation on the mentioned factors could increase or decrease in a given moment the traffic of packets traveling in any direction. Since the buffers assignment is static, those assigned to the low traffic transfer would be unused, while the high traffic transfer could not be assisted because of the lack of memory space.

In the recent past there have been different approaches to the queue management mechanism (e.g. U.S. Pat. No. 6,137,807). That invention proposes a temporal buffering of data in the form of logical queues to supply a series of output ports. However, such invention is oriented to data buffering and queue control only, without the possibility of including any kind of data processing or data transformation. That invention also proposes the use of a specialized ASIC (application specific integrated circuit) to physically implement the memory controller. Even when an ASIC optimizes the performance, it does not offer the programmable flexibility of a microcontroller. Furthermore, that implementation considers unidirectional data flow by defining an input-only source and an output-only destination.

It is the intention of this invention to overcome such limitations providing an efficient method to handle multiple communication queues capable of transporting information packets between two or more communication interfaces with a bidirectional communication.

SUMMARY OF INVENTION

The present invention comprises a method for handling multiple logical communication queues sharing one physical memory space. Having a banked RAM, each bank is used as an individual memory buffer independent of the existing type of queues. Since there is no static memory buffer assignment to each type of queue, all banks are available for all queues, making efficient use of memory resources even when the traffic generated by each queue can vary dynamically.

The hardware platform is an 8-bit microcontroller which contains both a programmed process to be applied to any incoming packet and the queue management mechanism needed to temporarily store each packet.

A simple mechanism to handle the available memory and queues has been created in accordance to the processing power of the microcontroller, by reducing the complexity of the involved algorithm and the amount of memory needed to control the queues.

OBJECTS AND ADVANTAGES

Accordingly, several objects and advantages of the present invention are: a) To provide a memory management method capable of handling multiple queues needed to accomplish a process of receiving input information to generate an output result.

b) To provide the concurrent handling of logical queues sharing the same physical banked memory.

c) To provide an efficient mechanism to handle each logical memory queue, suitable to a low processing power 8-bit microcontroller.

Other objects and advantages of this invention will become apparent from a consideration of the ensuing description and drawings.

Figure 1:
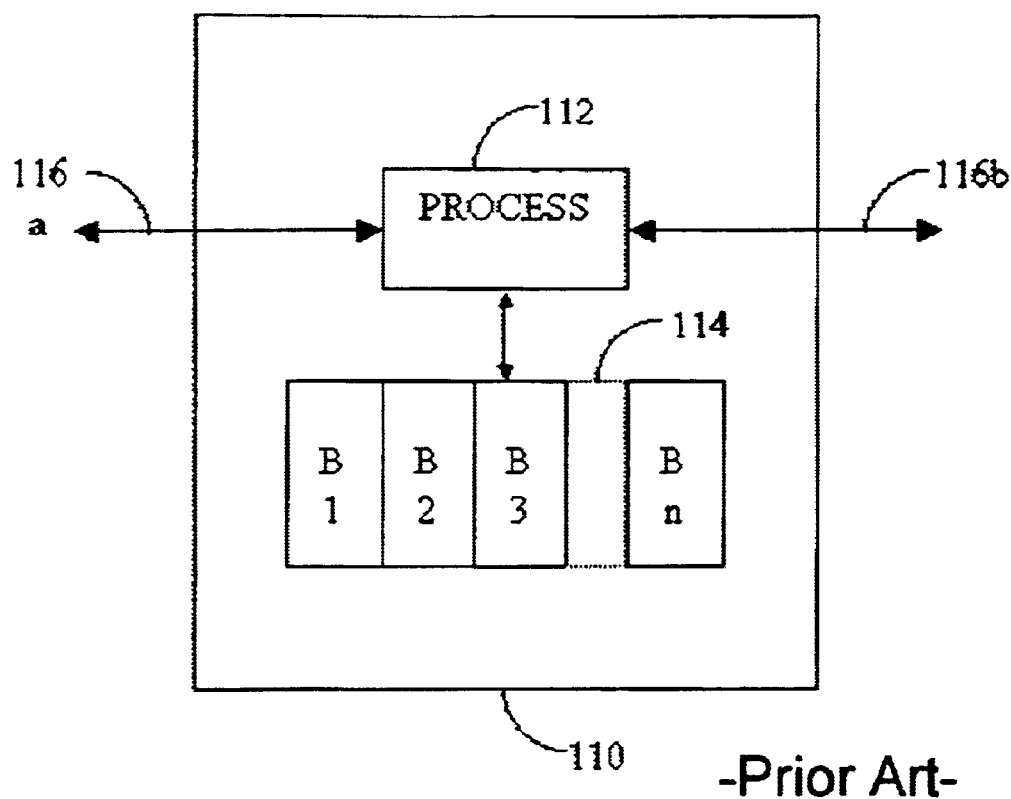
FIG. 1 shows the elements from an 8-bit microcontroller involved in this invention.

LIST OF REFERENCE NUMERALS IN DRAWINGS 110 8-bit microcontroller
112 Process or algorithm executing in an 8-bit microcontroller
114 Banked RAM available for the process
112116a, 116b Communication interfaces between the microcontroller 110 and external microprocessors.
210, 212, 214, 216 Memory buffers number 0, 1, 2 and 3 respectively 218a, 218b Memory buffer queues
310 Variables related to the general memory management
312a, 312b Variables related to queue management
314a, 314b Variables related to logical queue continuity
410, 510, 610 Flowchart start blocks
412, 418, 426, 512, 516a, 516b, 516c, 520a, 520b, 520c, 614 Flowchart decision blocks
416, 420, 422, 424, 430, 518a, 518b, 518c, 522a, 522b, 522c, 612, 616, 618 Flowchart process blocks.
414, 428, 514, 628 Flowchart end blocks

DETAILED DESCRIPTION

Now, the present invention will be described by referring to the accompanying drawings that illustrate preferred embodiments of the invention.

A banked memory available in an 8-BMC, like the one shown on FIG. 1, must support two different queues contained in the same available banked RAM (114).

This invention proposes the use of memory banks as individual positions available to any of the two needed queues. In this embodiment, each bank is itself a complete memory buffer and a memory buffer denotes a queue position.

A free memory buffer is not associated with any of the queues. When a new packet arrives from any of the shown interfaces (116a, 116b), the next available free buffer is assigned to the queue related to that interface. This promotes a dynamic buffer assignment dependent of the traffic generated in one direction or another.

The size of each memory buffer is predefined based on the maximum size of packet expected from any of the interfaces. This invention deals with low processing power 8-BMC where the amount of programming code is one of the most critical issues. By fixing the size of a memory buffer, process 112 doesn't waste extra computational time obtaining the beginning and end of a packet. Only a program routine considering a predefined size of buffer and knowing the first buffer in the queue may involve less processing time to obtain a result than dynamic buffer size assignment.

Figure 2A:
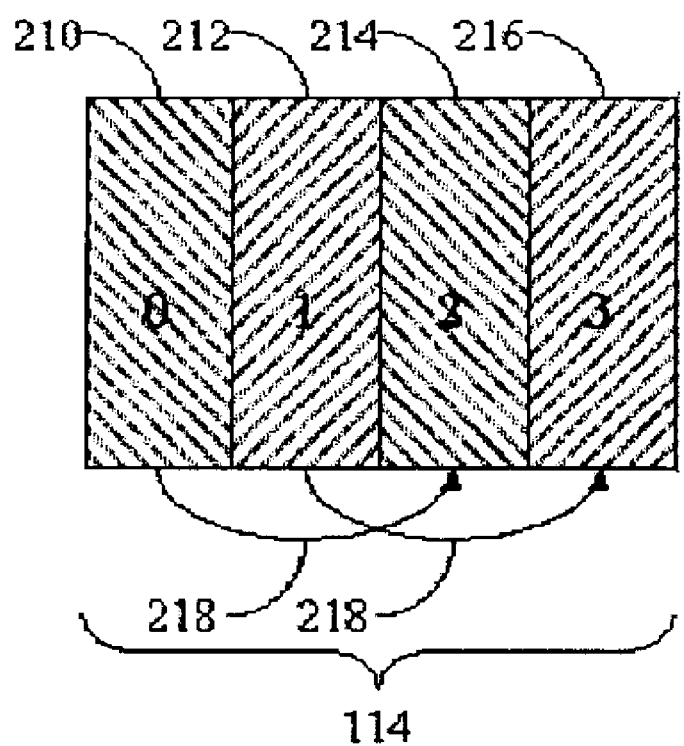
FIG. 2a shows an example of two logical queues sharing the same physical banked RAM.

Each buffer can be part of any queue, even when all buffers are part of the same RAM. FIG. 2a shows a hypothetical RAM 114 with four contiguous memory banks (210, 212, 214, 216). Physically, buffers are sequentially ordered, buffer 210 being number 0 and buffer 216 being number 3. However, there are two logical queues, one for each information flow direction. Queue 218a begins with buffer 210 and finishes with buffer 214, while queue 218b begins at buffer 212 and finishes at buffer 216. Summarizing, queue 218a uses buffers 0 and 2 and queue 218b uses buffers 1 and 3.

Figure 2B:
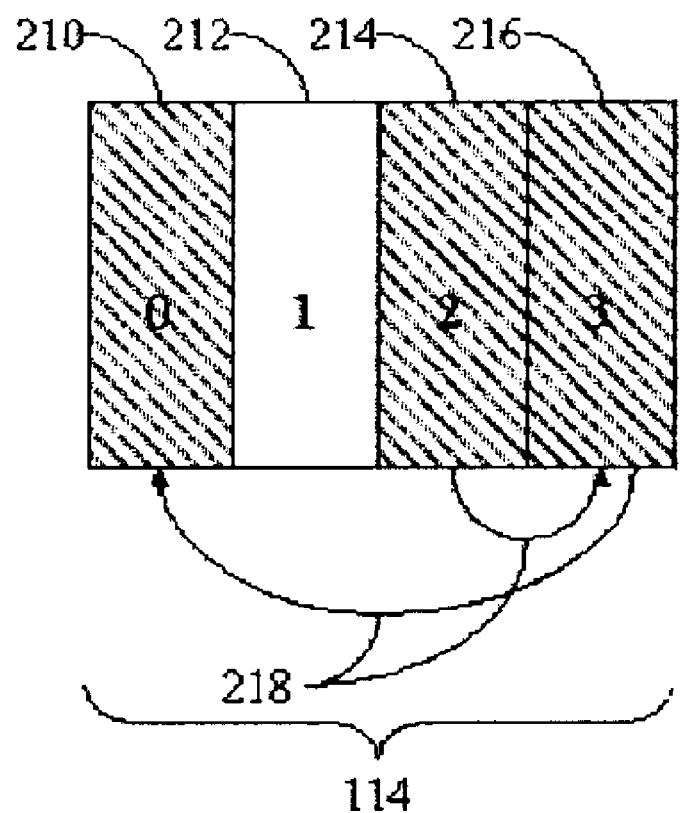
FIG. 2b shows an example of one logical queue using a banked RAM.

Another situation is depicted in FIG. 2b. In this case, queue 218a occupies three buffers beginning at buffer 214, continuing at buffer 216 and finishing at buffer 210. Queue 218a grows upwards through RAM with buffers 2 and 3 and goes back to buffer 0 at the end. Queue 218b is not being used in this case. Buffer 212 is free at this moment, so it is available either for queue 218a or queue 218b as needed.

Figure 3A:
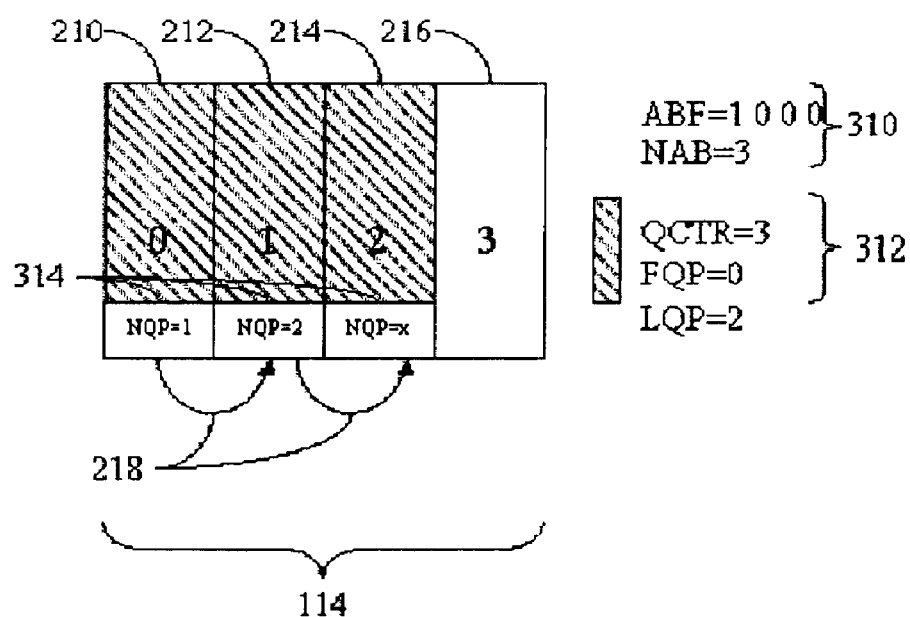
FIG. 3a shows an example of one logical queue using the mechanism provided in this invention.

In order to establish each logic queue, three groups of variables have been created. FIG. 3a shows the RAM 114 with three used buffers by the queue 218a. The other queue 218b is not shown to explain a first simple case.

The first group of variables 310 is referred to global management of buffers. The Available Buffers Flags (ABF) is divided in bits and indicates the state of each buffer. The less significant bit (bit 0) represents buffer 0. In this case, the bit 3 represents the last existing buffer (number 3) and the four most significant bits are unused. It must be noted that each memory register contains 8 bits, so a new memory register must be added for each group of eight buffers added, that is to say, to handle a number of buffers that is a multiple of eight there must be a number of ABF registers equal to that number. For example, to handle the cases of 8, 16 or 24 buffers, there must exist 1, 2 and 3 ABF registers, respectively.

When a flag in the ABF is set to 1, the corresponding buffer is considered free. When the flag is set to 0, the buffer is considered occupied by any of the queues. The Next Available Buffer (NAB) contains the number of the next free buffer in the RAM 114. If all the buffers are in use (all ABF are set to 0), this variable is ignored until a buffer becomes available. In the example shown on FIG. 3, there are three buffers occupied by queue 218a. The ABF are then [1 0 0 0] since buffer number 3 (216) is free. The NAB is valid (there is a free buffer) and contains the number 3, indicating the third buffer is not in use.

The second group of variables 312a is related specifically to the queue. The Queue Counter (QCTR) indicates the number of buffers in the queue. The First Queue Position (FQP) and Last Queue Position (LQP) contain the first and last buffers in the queue. In this example, the QCTR must be 3 since there are three buffers used by queue 218a, the FQP is 0 since buffer number 0 (210) was the first and the LQP is 2 indicating the buffer 2 occupies the last position in the queue.

Using the QCTR, process 112 may know if there are more buffers waiting in queue 218a, being the FQP the first buffer waiting to be read. The LQP makes the existence of a logic queue possible; each new buffer added to the queue can know, through this value, which is the previous buffer.

The third group of variables (314a) are pointers contained in each buffer. The Next Queue Position (NQP) points to the next buffer in the queue. In this case, buffer 0 (210) points to buffer 1 (212) and this last points to buffer 2 (214). This is the LQP and its NQP is not valid. When the FQP is not needed anymore (it already has been processed), the NQP indicates which buffer will occupy the first position in the queue (FQP).

Figure 3B:
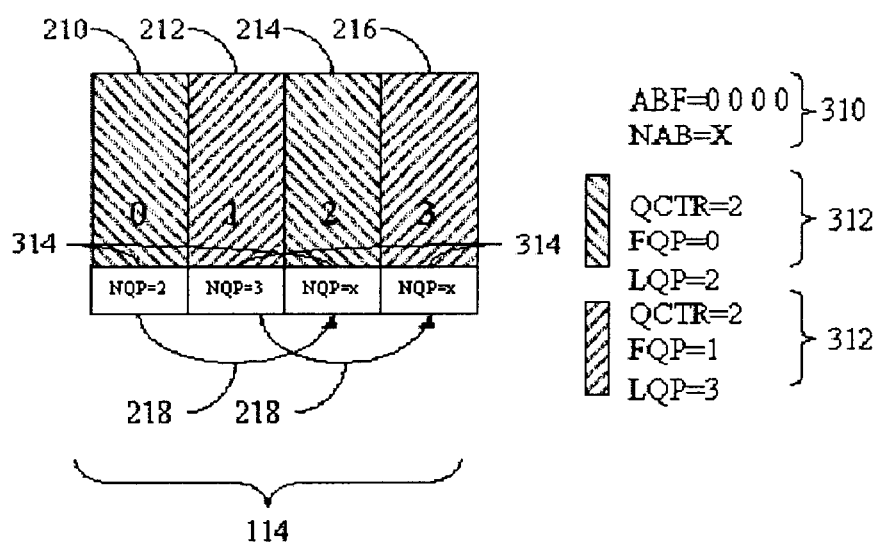
FIG. 3b shows an example of two logical queues using the mechanism provided in this invention.

A more complex context is shown in FIG. 3b, with the inclusion of the second queue 218b. This time all the buffers are in use, so the ABF are set to [0 0 0 0] and the value in NAB is ignored, since there are no free buffers.

Queue 218a occupies buffers number 0 and 2 (210, 214). Thus the QCTR is 2, the queue begins at a FQP=0 and ends in a LQP=2 (312a). Queue 218b occupies buffers number 1 and 3 (212, 216), so the QCTR is also 2 (two used buffers) but the FQP=1 and the LQP=3 (312b), since this queue begins at buffer 1 and finishes at buffer 3.

Finally, buffer 0 (210), being the first position in queue 218a, points with its NQP to the next position, buffer 2 (214). Buffer 2 (214) has the last position and its NQP is ignored (314a).

In the other hand, buffer 1 (212) has the first position for queue 218b and its NQP points to the next buffer, i.e., buffer 3 (216). Again, buffer 3 is the last queue element and its NQP is not valid (314b).

The interaction between the three kinds of variables (310, 312, 314) allows the handling of logical queues independently of the physical RAM distribution. Based on the example shown on FIG. 3b, an extension can be made to support more than two queues. In fact, an unlimited number of queues sharing the same RAM can be defined, each one with its own set of queue variables (312). Such number is limited by the amount of available memory buffers and the extra memory needed by each queue variable set.

Process 112 controls information flow, executing three basic functions. First, information packets coming from any interface (116a or 116b) must be received and queued by storing them in a free memory buffer. Second, the first packet in each queue is processed to send the final result to the corresponding interface (116a to 116b and vice versa). Third, the buffer is freed since it's not needed anymore.

Figure 4:
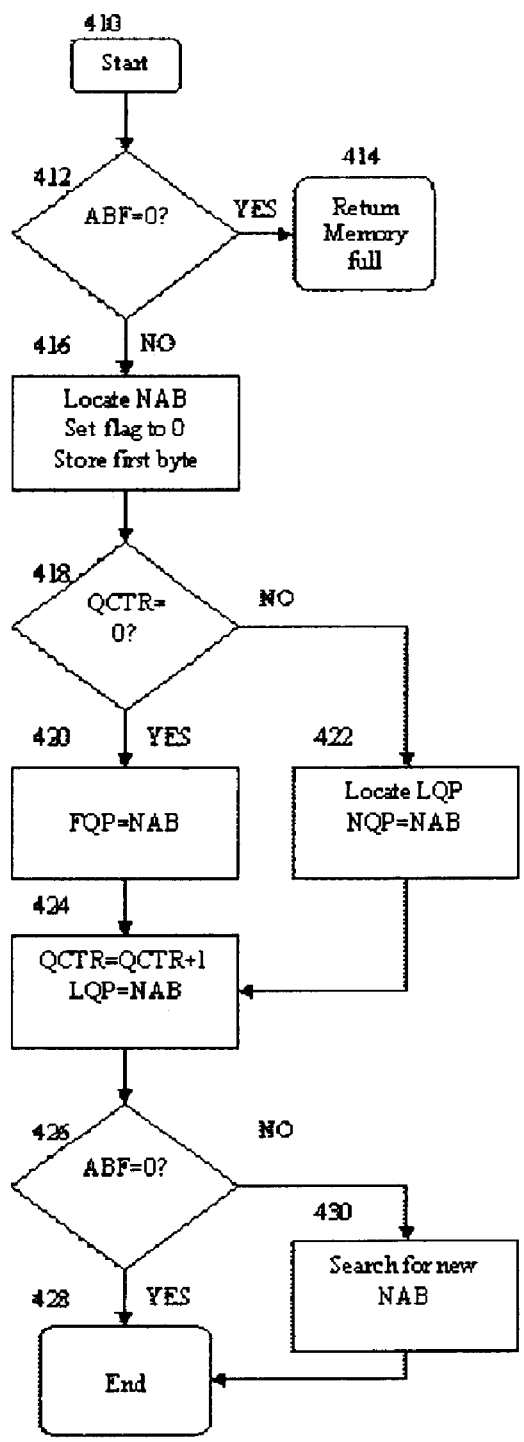
FIG. 4 shows the flowchart of the receiving function designed for this invention.
Figure 5:
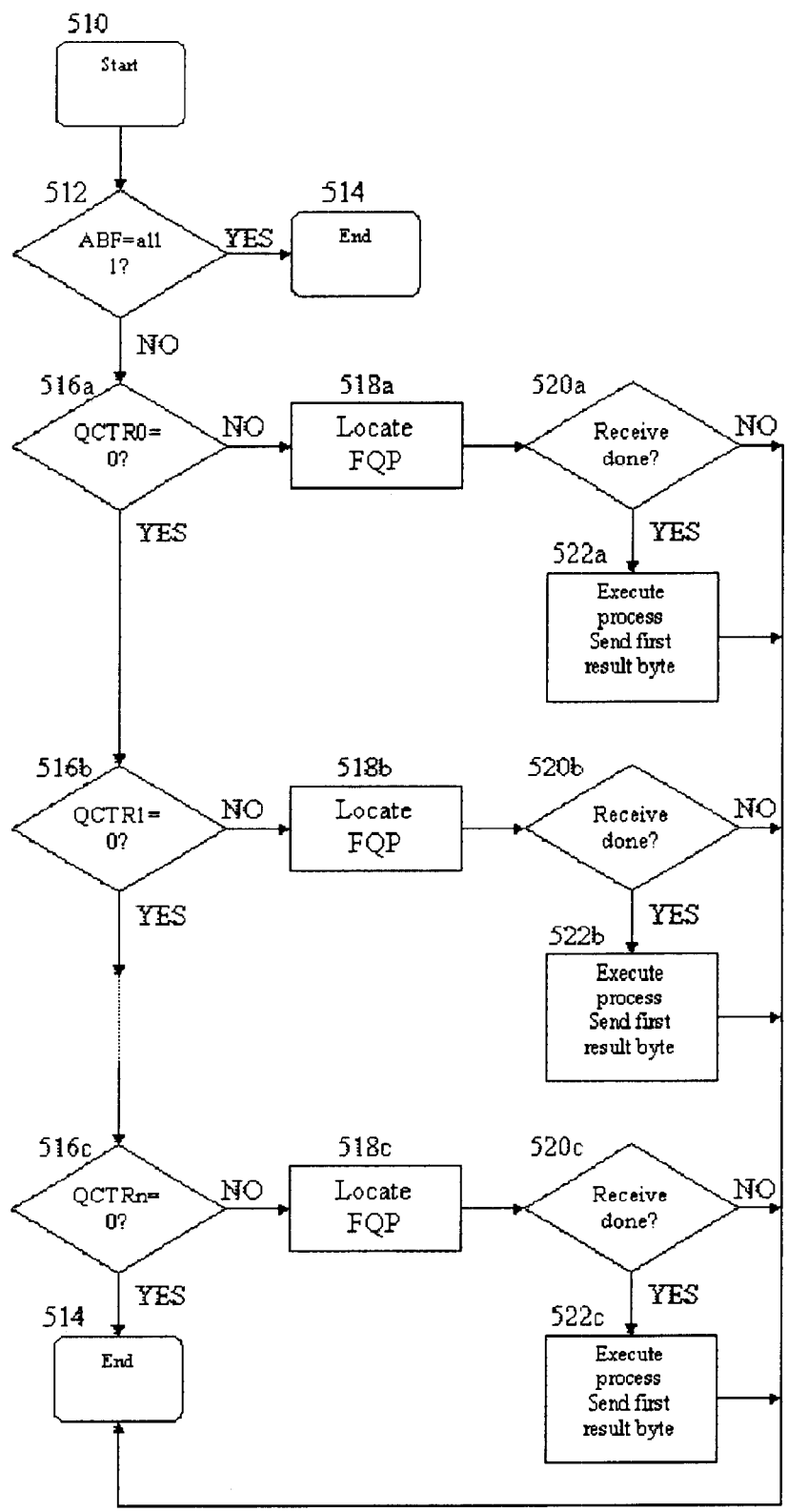
FIG. 5 shows the flowchart of the processing function designed for this invention.
Figure 6:
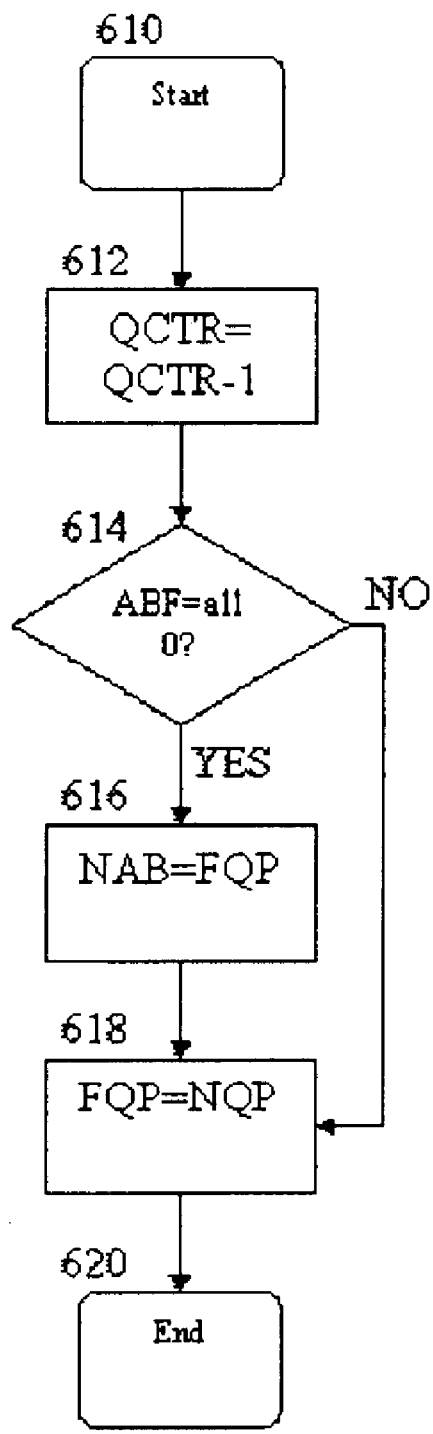
FIG. 6 shows the flowchart of the buffer freeing function designed for this invention.

The flowchart describing each step is shown on FIGS. 4, 5 and 6. The operation is explained next.

OPERATION OF INVENTION In order to receive an incoming packet from an interface, a receiving function can be explained with the flow chart shown on FIG. 4. The function begins with a transmit request or the arrival of the first byte of information (410). The ABFs are checked to make sure there is at least one free buffer (412). If the ABFs are all set to 0, the function aborts the operation since all memory buffers are occupied (414). If there is at least one free buffer, the NAB will contain its physical position. The buffer pointed in the NAB is used as the active buffer, being the active buffer the one used by the function to receive the packet. The flag related to the active buffer is set to 0 in the ABF, indicating the buffer is not free anymore. At this point the first byte of information is stored in the active buffer (416). In an 8-BMC, the use of hardware-implemented communication ports simplifies the reception of each additional byte, since the microcontroller itself generates an interrupt indicating the arrival of a new byte.

The QCTR is matched with 0 (418). If it's true, there are no elements in the queue and the active buffer (its position is stored in NAB) will occupy the first position in the queue; thus the value in NAB is stored in the FQP (420). If the QCTR is greater than 0, it means there is at least one buffer in the queue and the position of its last buffer is stored in the LQP. The buffer indicated in the LQP is located and the value of the NAB is stored in its NQP (422). With this procedure, the buffer that is the last element in the queue LQP will contain a pointer NQP to the active buffer, indicated by NAB.

A new element has been added to the queue, so the QCTR is increased in one unit and the new LQP takes the value of the active buffer (424).

The queue has already been updated, only the assignation of a new NAB remains to be done. To do that, the ABF is matched to 0 (426). If it's true, there are no more free buffers and the function ends (428). Otherwise, there are free available buffers and the new NAB will be selected by testing each flag contained in the ABFs, beginning from the flag representing the active buffer, going up and rolling back to the least significant bit when the last flag is reached. When a flag set to 1 is found, the NAB will be assigned to the free buffer represented by that flag. By testing the flags from the active buffer and up, the use of each buffer in a given moment will be guaranteed, since the NAB position assignation will follow an increasing and circular pattern. The buffers usage will be uniform, extending the useful life of the RAM. Furthermore, the circular mechanism minimizes the number of retries in the flag testing, since the position next to the active buffer is always the oldest used buffer and very likely will be free.

The next step after occupying a buffer is to apply the process. FIG. 5 shows a flowchart representing the processing function. The function starts (510) and begins by polling the ABF (512). If all the flags are set to one, all the buffers are freed and the function ends (514). If that is not the case, the QCTR defined for each type of queue is checked. In the flowchart the different queues are named QCTR0, QCTR1 and QCTRn (516a, 516b, 516c), with the latter indicating an unlimited number of queues. If the QCTR value is not 0, the FQP of that queue is located (518a, 518b, 518c) and checked to make sure all the bytes have been received (520a, 520b, 520c). If the reception of all bytes of the packet has not finished, the next existing QCTR is checked (520a, 520b). If there are no more defined QCTR, the function ends (520c).

If the entire information has arrived, the buffer goes through the process (522a, 522b, 522c) and the result is sent to the corresponding interface. Then, the next QCTR (522a, 522b) corresponding to other(s) queue(s) is checked to execute the same steps or the function ends if it is the last queue (522c).

The third and final step, shown on FIG. 6, is executed when the result has been entirely sent through the corresponding interface. The buffer freeing function is called (610) with the parameter QCTR to know which queue is involved. The QCTR is decreased in one unit, reducing (612) the queue length. The ABF are then matched with 0 (614). If it's true, it means there were no available buffers before and this is the first being released, so the value of the FQP (this variable contains the buffer being released) is stored in the NAB (616). Then the FQP is reassigned with the value contained in the buffer's NQP, placing the next element in the queue as the first position (618). Finally the function ends successfully and the main program execution continues.

Conclusion, Ramifications and Scope of Invention

Thus, the reader will see that the queue management mechanism proves to be at once efficient and simple. It is efficient because it allows the existence of multiple logical queues into the same banked RAM with a dynamic buffer assignment according to the queue demand. It is simple because it uses straight forward algorithms and a small amount of memory to control the queues. These characteristics make the invention suitable for its implementation in a low processing power 8-bit microcontroller.

While our above description contains many specificities, these should not be construed as limitations to the scope of the invention, but rather as an exemplification of one preferred embodiment thereof. Obviously, modifications and alterations will occur to others upon a reading and understanding of this specification such as, for example, different size for the variables used to control each queue, or a different flag method used to maintain the record of free and used buffers. Each memory buffer could also have a variable size, in expense of a more complex memory allocation mechanism.

The description above is intended, however, to include all such modifications and alterations insofar as they come within the scope of the appended claims or the equivalents thereof.

What is claimed is:

1. A method for handling multiple logical communication queues sharing one physical memory space comprising the steps of:
   using a plurality of memory banks with each memory bank serving as a memory buffer;
   using the memory buffer to denote a queue position;
   defining a size of the memory buffer based on the maximum size of any expected data packet;
   using bits of a plurality of available buffers flags to indicant which memory buffers are being used where each of the plurality of available buffers flag is one byte long and can flag the availability of four memory buffers;
   using a next available buffer field to indicate the next buffer that is free;
   loading a queue to a plurality of memory banks;
   using a queue counter to indicate the number of buffers in the queue;
   using a first queue position value that contains the first memory buffer used by the queue;
   using a last queue position value that contains the last memory buffer used by the queue; and,
   using a next queue position value that points to the next memory buffer in the queue.

2. The method of claim 1, wherein it is used with a low processing power 8-bit microcontroller.

3. The method of claim 1, wherein it is used with FIFO processing.

4. The method of claim 1, wherein the additional steps are used comprising:
   receiving a packet of data from an interface;
   checking the available buffer field to see if there is an available memory buffer;
   aborting the request if there is no free memory buffer;
   using the next available buffer pointers to find the next available memory buffer if a memory buffer is free;
   loading the data packet to the memory buffer given in the next available buffer;
   setting the available buffer flag to not free for a loaded memory buffer;
   checking a queue counter field to see the number of memory buffers to be used;
   setting the first queue buffer to a first queue loaded;
   setting the last queue buffer and check for the next available buffer if the queue counter field shows more than one memory buffer;
   checking to make sure that all of the queue has been received, if not repeat the previous steps until all of the queue has been received into the memory buffers; and
   resetting the queue counter, the availability block flags and the next available blocks after the queue has been processed.

5. A device for handling multiple logical communication queues sharing one physical memory space comprising:
   a plurality of memory banks with each memory bank serving as a memory buffer;
   a memory buffer means used to denote a queue position with the memory buffer size based on the maximum size of any expected packet;
   a plurality of available buffers flags to indicate with memory buffers are being used where each of the plurality of available buffers flag is one byte long and can flag the availability of four memory blocks;
   a next available buffer field to indicate the next buffer that is free;
   a loading means to load a queue to a plurality of memory banks;
   a queue counter to indicate the number of buffers in the queue;
   a first queue position value that contains the first memory buffer used by the queue;
   a last queue position value that contains the last memory buffer used by the queue; and
   a next queue position value that points to the next memory buffer in the queue.

6. The device as in claim 5, wherein it has a low processing power 8-bit microcontroller.

7. The device as in claim 5, wherein it uses FIFO processing.

8. A computer program product for handling multiple logical communication queues sharing one physical memory space comprising a computer usable medium having computer readable program code thereon, including:
   program code for using a plurality of memory banks with each memory bank serving as a memory buffer;
   program code for using the memory buffer to denote a queue position;
   program code for defining a size of the memory buffer based on the maximum size of any expected packet;
   program code for using bits of a plurality of available buffers flags to indicant which memory buffers are being used where each of the plurality of available buffers flag is one byte long and can flag the availability of four memory buffers;
   program code for using a next available buffer field to indicate the next buffer that is free;
   program code for loading a queue to a plurality of memory banks;
   program code for using a queue counter to indicate the number of buffers in the queue;
   program code using a first queue position value that contains the first memory buffer used by the queue;
   program code using a last queue position value that contains the last memory buffer used by the queue; and,
   program code using a next queue position value that points to the next memory buffer in the queue.

9. The computer program product of claim 8, wherein it is used with a low processing power 8-bit microcontroller.

10. The computer program product of claim 8, wherein it is used with FIFO processing.

11. The computer program product of claim 8, wherein the base component has interfaces and the program code for:
   checking the available buffer field to see if there is an available memory buffer;

aborting the request if there is no free memory buffer;

using the next available buffer pointers to find the next available memory buffer if a memory buffer is free;

loading the packet to the memory buffer given in the next available buffer;

setting the available buffer flag to not free for a loaded memory buffer;

checking a queue counter field to see the number of memory buffers to be used;

setting the first queue buffer to a first queue loaded;

setting the last queue buffer and check for the next available buffer if the queue counter field shows more than one memory buffer;

checking to make sure that all of the queue has been received, if not repeat the previous steps until all of the queue has been received into the memory buffers; and resetting the queue counter, the availability block flags and the next available blocks after the queue has been processed.

* * * * *